United States Patent
Forster

(10) Patent No.: US 7,107,931 B1
(45) Date of Patent: Sep. 19, 2006

(54) METHOD FOR AUTOMATICALLY CALIBRATING A DEVICE FOR PROVIDING DOMESTIC ANIMALS WITH A FEED

(76) Inventor: Martin Forster, Gerwigstrasse 25, D-78234, Engen (DE)

( * ) Notice: Subject to any disclaimer, the term of this patent is extended or adjusted under 35 U.S.C. 154(b) by 0 days.

(21) Appl. No.: 09/647,604

(22) PCT Filed: Mar. 29, 1999

(86) PCT No.: PCT/EP99/02142

§ 371 (c)(1),
(2), (4) Date: Oct. 30, 2000

(87) PCT Pub. No.: WO99/49726

PCT Pub. Date: Oct. 7, 1999

(30) Foreign Application Priority Data

Apr. 1, 1998 (DE) .......................... 198 14 531

(51) Int. Cl.
*A01K 5/02* (2006.01)

(52) U.S. Cl. ...................... 119/51.11; 119/71
(58) Field of Classification Search ............. 119/51.11, 119/57.92, 71; 222/650
See application file for complete search history.

(56) References Cited

U.S. PATENT DOCUMENTS

| | | | | |
|---|---|---|---|---|
| 3,303,822 A | * | 2/1967 | Cohen ................. | 119/57.92 X |
| 3,524,432 A | * | 8/1970 | Tartar ...................... | 119/51.11 |
| 4,502,416 A | | 3/1985 | Keysell et al. .......... | 119/51.11 |
| 4,667,603 A | | 5/1987 | Loos | |
| 5,105,767 A | | 4/1992 | Gordon et al. .......... | 119/57.92 |
| 5,899,367 A | * | 5/1999 | Strength et al. ........ | 222/650 X |

FOREIGN PATENT DOCUMENTS

| | | |
|---|---|---|
| EP | 0285596 | 10/1988 |
| GB | 2161282 | 1/1996 |

* cited by examiner

*Primary Examiner*—Robert P. Swiatek
(74) *Attorney, Agent, or Firm*—Bachman & LaPointe, P.C.

(57) ABSTRACT

A method for automatically calibrating the control system of a device for providing domestic animals with a feed. The feed or the constituents thereof are discharged from supply containers (2.1–2.5) into a mixing container (1) which is connected to an area (3) from which the animals can take the feed. The time at which the feed or at least one of its constituents is added is predetermined in the control system and the time required for a certain quantity (volume and/or weight) of the feed or of a certain constituent of the feed to reach the mixing container (1) is determined automatically at intervals. In the event that the desired quantity is modified, the time which is predetermined in the control system is also modified.

5 Claims, 1 Drawing Sheet

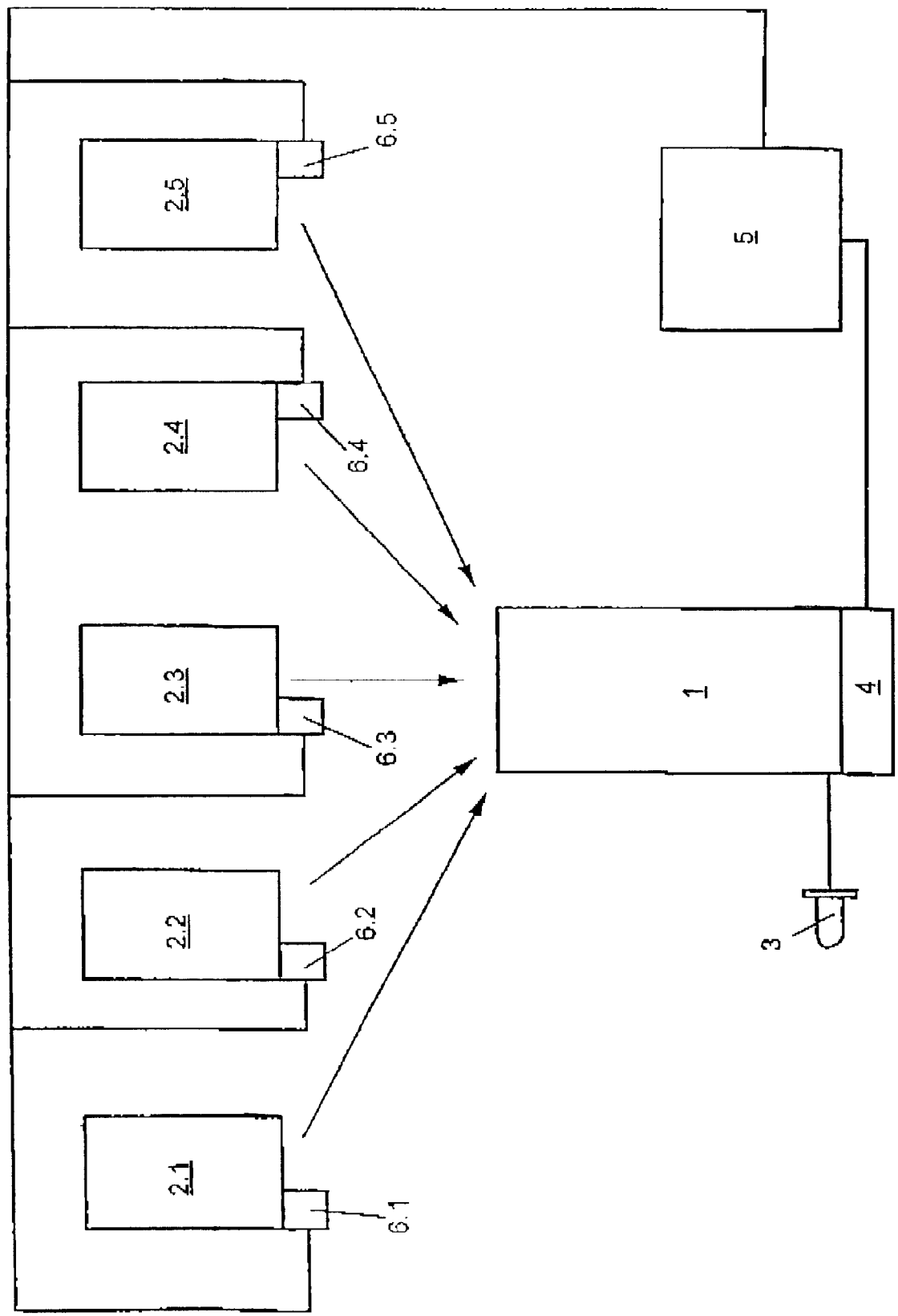

US 7,107,931 B1

METHOD FOR AUTOMATICALLY CALIBRATING A DEVICE FOR PROVIDING DOMESTIC ANIMALS WITH A FEED

BACKGROUND OF THE INVENTION

The invention relates to a method of automatically calibrating a control means of an apparatus for providing domestic animals with a feed which, or the constituent parts of which, passes/pass from supply containers into a mixing container which is in connection with a removal location.

The operation of providing domestic animals with feed nowadays mostly takes place automatically. This applies, in particular, to the rearing of young animals (calves, piglets, lambs inter alia) for which so-called automatic drinkers are used. In these automatic drinkers, constituent parts of the feed are mixed in a mixing container and supplied to a sucking location. The constituent parts of the feed may pass into the mixing container from supply containers or from corresponding supply lines. This term supply containers is intended to cover all possible means of supply to the mixing container.

It is precisely for the purpose of rearing, however, that the addition of feed has to take place very precisely in order to achieve a favorable fattening result. This means that the mixing ratio in which the individual constituent parts of the feed are mixed with one another in the mixing container, and supplied to the sucking location, has to be determined precisely.

Up until now, the total quantity and a fair number of individual portion quantities have merely been determined manually. This takes place at well-spaced apart time intervals and without any great precision. Irregularities which occur between said intervals cannot be detected and corrected. For example it is possible, with the addition of milk powder, for an outlet on the milk-powder-supply container to become gummed up at short time intervals since there may be high air humidity in the region of the automatic drinker. The milk powder is hygroscopic and narrows the outlet opening of the supply container by the gumming-up action, with the result that, over a certain time over which the outlet opening of the supply container is open, with a narrowed outlet, a relatively small quantity of milk powder passes into the mixing container. This means that the mixing ratio is no longer correct. If this is detected, then the corresponding outlet has to be cleaned.

U.S. Pat. No. 4,677,503 describes a calibrating method for volume measurement and an apparatus for implementing the method, in which, via a plurality of independent containers, different ingredients are supplied to common scales, weighed there and, following the weighing operation, supplied to a mixing container.

The object of the present invention is automatically to monitor the addition of a feed and, in particular, the mixing ratio of the individual constituent parts of the feed, and to adapt the supply of constituent parts of the feed to changed values.

SUMMARY OF THE INVENTION

This object is achieved by providing an apparatus for providing domestic animals with a desired predetermined feed mixture supplied from a plurality of supply containers to a mixing chamber which is connected to a removal location for a domestic animal, a method for monitoring the feed mixture to maintain a desired predetermined feed mixture over time comprising the steps of: providing a predetermined feed mixture to a mixing chamber from a plurality of supply containers, each housing an ingredient of the feed mixture, by feeding a desired amount of an ingredient from at least two of the plurality of supply containers to the mixing chamber to obtain the desired predetermined feed mixture, wherein each ingredient is feed for a selected time period to obtain the desired amount; measuring at predetermined intervals an amount of currently discharged ingredient from each of the plurality of supply containers over the selected time period; comparing the amount of currently discharged ingredient to the desired amount of ingredient; and adjusting the selected time period for feeding each ingredient to insure the desired amount of ingredients in the desired predetermined feed mixture.

This measurement can take place individually and separately for each constituent part of the feed or else separately for a number of constituent parts of the feed or for all of the constituent parts of the feed. For example, determining the quantity of water over the time period is not as important since this factor seldom changes. There are only slight variations in the supply of water.

The case is different as far as adding milk powder is concerned. The same also applies to adding medicine components to the feed, for which precise determination is essential.

The basic idea of the present invention is that, at certain intervals, the operation of all the constituent parts of the feed being automatically added together to the mixing container is interrupted, be this triggered by the actual operator or by a corresponding pulse in the control means. Instead, the constituent parts of the feed are supplied to pa the mixing container separately at discrete points in time one after the other. At the same time, the time period which is required by a certain quantity (weight and/or volume) of constituent parts of the feed is determined. If this time period deviates from a time period previously predetermined in the control means, then the old value is replaced by the new calibration value.

Difficulties may arise with constituent parts of the feed which are only added in very small quantities, for example medicine components. These medicine components may be added in tenths of a gram, although, for example, scales only measure the weight in grams. In this case, provision is made, for calibration purposes, for the outlet of the supply container to be opened, for example, on ten occasions during a certain time period and then for the determined quantity to be divided by ten. Since the animal should not drink such a mixture, said mixture, following the calibrating operation, is extracted from the mixing container by suction, or let out of the same, and removed.

Once the desired, new calibration values have thus been established in the control means, automatic operation is resumed. However, it may then be assumed that, within the time period corresponding to the calibration value now set, precisely the desired quantity of constituent parts of the feed which is required by the drinking animal in each case is supplied.

During the calibrating operation and during the other quantity recording, of course, the supply of feed to the animal is stopped. Furthermore, following each discharge, the installation is zeroed again.

It is also conceivable for the calibration to be carried out two or more times in succession in order to determine whether there are deviations. If there are deviations beyond a predetermined desired value, then, for example, an average may be taken as the calibration value, or else an alarm is triggered, this indicating that there is something wrong with the installation.

The automatic drinkers or the like which are already commercially available only have to be converted to a slight extent. The mixing container should be assigned scales via which the weight of the individual constituent parts of the feed can be determined. If it is to be possible for the constituent part of the feed to be determined with reference to other parameters, for example with reference to the filling level of the mixing container, then, of course, these values are used as the basis for the calibration. In this case, determination takes place via a filling-level sensor or light sensor. Determination by ultrasound is also conceivable.

The determination of the quantity of constituent parts of the feed also has other advantages. It may be the case that, rather than drinking the entire mixed quantity intended for it, an animal only drinks some of this quantity. By determining the quantity of feed, be this with reference to the weight or with reference to the filling level, it is then possible to determine how much the animal has actually drunk. Furthermore, the remainder is usually removed from the mixing container by a following animal, with the result that it is also possible to determine the additional quantity drunk by said animal.

By determining the time period during which the outlets of the individual supply containers are open, it is also possible to carry out a precise apportioning check as the constituent parts of the feed are mixed together. Since it has been determined what quantity of constituent part of the feed passes out of the supply container during which time period, it is possible to conclude the quantity. Once all the discharge openings of the supply containers and/or supply lines have been closed, a certain quantity of feed should be located in the mixing container, i.e. said quantity should have a certain weight or a certain filling level. If this is not the case, the calibrating operation specified above should be initiated in order to determine which supply container is malfunctioning.

It is also the case that, during this weighing check, the animal's access to the mixing container is blocked.

The method can also be used for adding just one type of feed, for example concentrated feed via a concentrated-feed apportioning means or a screw conveyer. The method is not intended to be restricted to use for young animals. It is possible to calibrate any feed for animals of any age.

BRIEF DESCRIPTION OF THE DRAWINGS

Further advantages, features and details of the invention can be gathered from the following description of preferred exemplary embodiments and with reference to the drawing, in which the single FIGURE shows a schematic illustration of an apparatus according to the invention for providing domestic animals with feed, for example an automatic drinker.

DETAILED DESCRIPTION

Of this automatic drinker, a mixing container 1 is indicated, this being assigned, in turn, five supply containers 2.1 to 2.5. Constituent parts of the feed are located in each case in said supply containers 2.1 to 2.5, for example milk powder, medicine, solely milk or also water, it being possible for all possible sources for the constituent parts of the feed to function as the supply containers. Supply container is also intended to mean, for example, normal supply line for water from a water-supply point.

The manner in which these constituent parts of the feed pass into the mixing container 1 is of secondary importance. It is merely indicated by arrows that the constituent parts of the feed can pass into the mixing container 1 via lines, directly, via chutes or the like.

In the mixing container 1, the feed is then mixed together from the different constituent parts thereof and directed to a removal location 3. The latter may be a suction location or else, for example, a trough or the like.

The mixing container 1 is assigned scales 4 which are in connection with the control means 5. Also in connection with the control means 5 are timing devices 6.1 to 6.5 which determine the time period required by a certain quantity of a constituent part of the feed in order to pass from the supply container 2.1 to 2.5 into the mixing container 1.

The present invention functions as follows:

The drinkers for calves used nowadays usually operate fully automatically. If, for example, a calf moves up to the sucking location 3, then, via a transponder of the control means, it is indicated to the drinker that a certain calf wants to drink. For this calf, then, a certain quantity of feed is mixed together in the mixing container 1, the corresponding constituent parts of the feed passing simultaneously from the supply containers 2.1 to 2.5 into the mixing container 1. Of course, the constituent parts of the feed are also predetermined for a certain calf, with the result that, for example, the addition of milk alone or of medicine can vary for each calf.

Over time, irregularities may occur in the introduction of the individual constituent parts of the feed into the mixing container 1. For example, an outlet on the supply container for milk powder may become gummed up, with the result that a predetermined quantity of milk powder takes longer to pass into the mixing container 1.

In order to counteract this disadvantage, the additions of the constituent parts of the feed are to be calibrated from time to time. This can take place, for example, once a day, once a week or following a predetermined quantity of discharged portions.

In accordance with the method according to the invention, the scales 4 are zeroed for calibration purposes. Then, separately from the other constituent parts of the feed, the mixing container 1 has a predetermined quantity of water added to it, and the time period required by this quantity of water is determined. This is the first calibration value.

The scales 4 are then zeroed again. Thereafter, a certain quantity of, for example, milk powder is supplied. The time period taken for this supply procedure is also determined, and a second calibration value is thus obtained.

This operation is carried out for each constituent part of the feed, with the result that it is possible to store in the control means 5 the precise times which are required for discharging and transferring a certain quantity of in each case the certain constituent part of the feed.

The apparatus according to the invention is then reset to automatic operation, although the calibration values then allow precisely the desired quantity of constituent parts of the feed to be added into the mixing container 1.

What is claimed is:

1. In an apparatus for providing domestic animals with a desired predetermined feed mixture supplied from a plurality of supply containers to a mixing chamber which is connected to a removal location for a domestic animal, a method for monitoring the feed mixture to maintain a desired predetermined feed mixture over time comprising the steps of:

providing a predetermined feed mixture to a mixing chamber from a plurality of supply containers, each housing an ingredient of the feed mixture, by feeding a desired amount of an ingredient from at least two of the plurality of supply containers to the mixing chamber to obtain the desired predetermined feed mixture, wherein each ingredient is fed for a selected time period to obtain the desired amount;

measuring at predetermined intervals an amount of currently discharged ingredient from each of the plurality of supply containers over the selected time period; comparing the amount of currently discharged ingredient to the desired amount of ingredient; and adjusting the selected time period for feeding each ingredient to insure the desired amount of ingredients in the desired predetermined feed mixture.

2. A method according to claim 1, wherein the measuring at predetermined intervals comprises measuring at least two times in succession and calculating an average of the two measurements.

3. A method according to claim 1, wherein the measuring at predetermined intervals comprises measuring at least two times in succession and triggering an alarm if a deviation occurs.

4. A method according to claim 1, wherein the measuring at predetermined intervals comprises discharging a multiple of the ingredient and thereafter dividing the ingredient by the multiple.

5. An apparatus for providing a predetermined feed mixture to a domestic animal comprises a plurality of supply containers each having timing means for discharging a desired amount of an ingredient;

a mixing chamber for receiving ingredients from each of the supply containers, the mixing chamber includes means for measuring the amount of each ingredient received; and control means for comparing the desired amount of ingredient to the measured amount of ingredient and adjusting the timing means to insure discharge of the desired amount of ingredient from each supply container to obtain desired predetermined feed mixture.

\* \* \* \* \*